United States Patent

[11] 3,557,654

[72] Inventor Harry C. Weidner, Jr.
  Shaker Heights, Ohio
[21] Appl. No. 738,338
[22] Filed June 19, 1968
[45] Patented Jan. 26, 1971
[73] Assignee The Atlas Bolt and Screw Company
  Cleveland, Ohio
  a corporation of Ohio

[54] PLASTIC HEADED FASTENER
  9 Claims, 7 Drawing Figs.
[52] U.S. Cl. ..................................... 85/9,
  151/38
[51] Int. Cl. ................................... F16b 23/00,
  F16b 39/24
[50] Field of Search ........................ 85/9, 1J.P.,
  28, 54, 53; 151/38, 7, 37

[56] References Cited
  UNITED STATES PATENTS
  2,850,064 9/1958 Rapata .......................... 151/7
  2,890,845 6/1959 Kiekhaefer ................... 85/1X
  3,134,290 5/1964 Jentoft .......................... 85/9
  FOREIGN PATENTS
  953,009 3/1964 Great Britain ................ 85/54
  883,340 11/1961 Great Britain ................ 85/1J.P.

Primary Examiner—Ramon S. Britts
Attorney—Jack M. Young

ABSTRACT: Each of these weathertight composite fasteners (having a plastic head molded onto a metal insert having a threaded shank) has three annular liquid seals, has a positive stop to its driving action controlling seal flexure and preventing fastener overdriving, locks its plastic head and any thin sheet member receiving the fastener onto the metal insert against pulloff in the driven position, and tightly and effectively secures together thin sheets.

PATENTED JAN 26 1971 3,557,654

INVENTOR.
HARRY C. WEIDNER JR.
BY Jack M. Young
ATTORNEY 3,557,654

1

PLASTIC HEADED FASTENER

BACKGROUND AND SUMMARY OF THE INVENTION

The invention relates to a composite fastener, having a metal shank with a screw thread thereon and having a molded plastic hexagon head with an integral sealing washer, especially adapted to be used as a weather-resistant threaded fastener for outdoor use in securing a building panel to a structural framework.

An object of the present invention is to provide a weather-resistant and corrosion-resistant fastener having an ordinary, inexpensive steel threaded shank protected by an encasing plastic head.

A further object of the present invention is to provide a sealing fastener, independent of any separate sealing washers or grommets, with the sealing action provided by an integral plastic sealing washer portion integral with the plastic head of the fastener.

A further object of the present invention is to provide a sealing type, composite screw fastener characterized by having a plurality of annular liquid seals; a positive metal stop to prevent overdriving and to control seal flexure; ability to fasten together thin metal sheet members, and plastic portions thereof moved axially toward the fastener-receiving member, plastic portions thereof moved radially inwardly between the fastener head and fastener-receiving member, and plastic portions thereof locked under the fastener head to prevent pulling off not only these plastic portions shaped as a plastic head but also any thin sheet member of the fastening-receiving member from the metal insert of the fastener, etc.

A further object of the present invention is to provide a plastic headed fastener characterized by its inexpensive manufacturing cost, ease of assembly and manufacture of its component parts, structural simplicity, many desirable fastener driving and use features, multiplicity of functional advantages for some of its component parts, attractive exterior appearance, and long, weatherproof wear life.

These and other objects, novel features and additional advantages of the present invention will become more clearly apparent by reference to the appended claims as the following detailed description and discussion proceeds in conjunction with the accompanying drawing.

DETAILED DESCRIPTION OF THE PREFERRED EMBODIMENTS

Figures 1, 4:
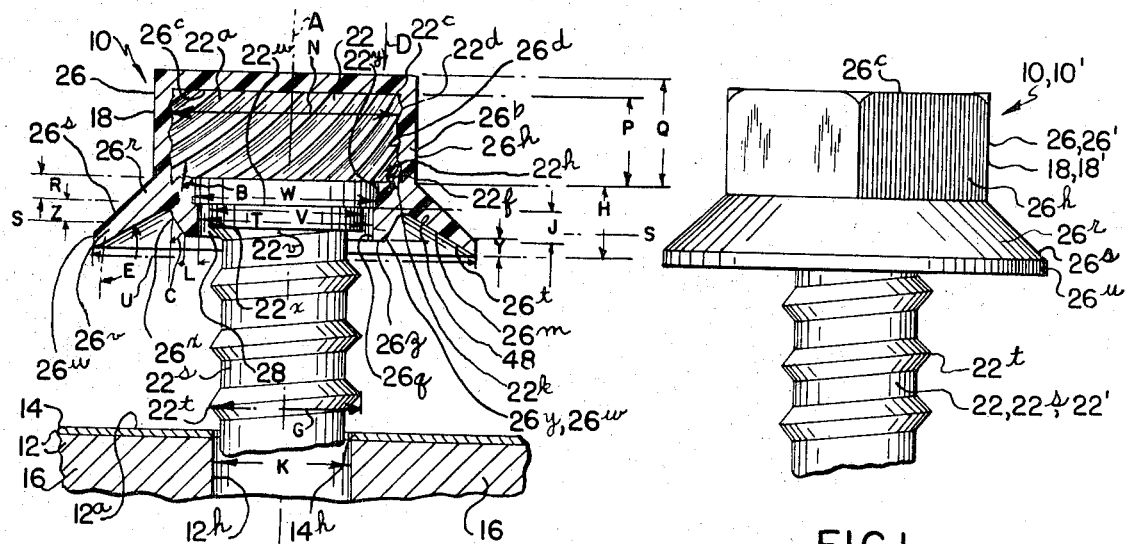
FIG. 1 is a side elevational view in relaxed and undriven position of a portion of the fasteners of the present invention shown in FIGS. 4—7.
FIG. 4 is a side elevational view of a portion of a first form of fastener in the present invention with the plastic head thereof and fastener receiving member shown in section and with the fastener being in relaxed and undriven position.
Figure 2:
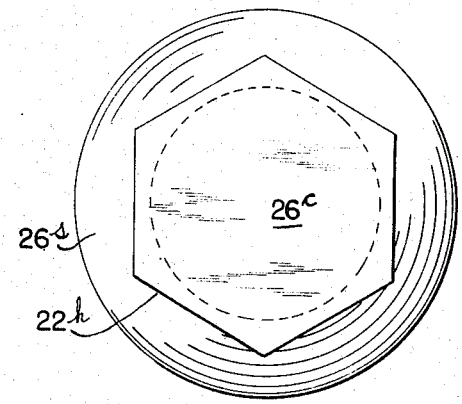
FIG. 2 is a top plan view of the fastener in FIG. 1 and of the fasteners of the present invention in FIGS. 4—7 shown in relaxed and undriven position.
Figure 5:
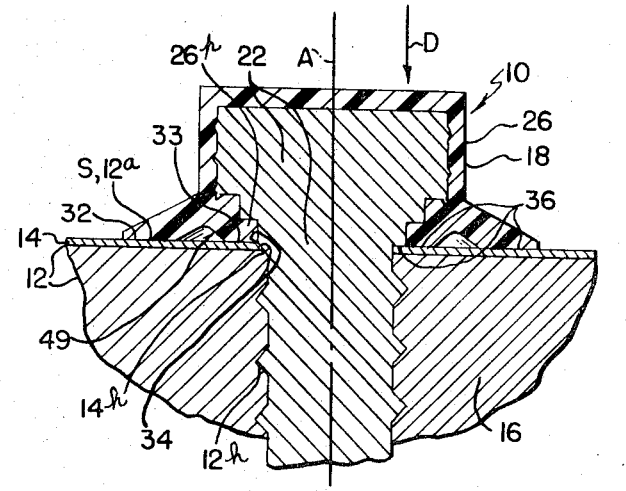
FIG. 5 is a vertical, longitudinal sectional view of a portion of the fastener in FIG. 4 shown in driven position in the fastener receiving member.
Figure 6:
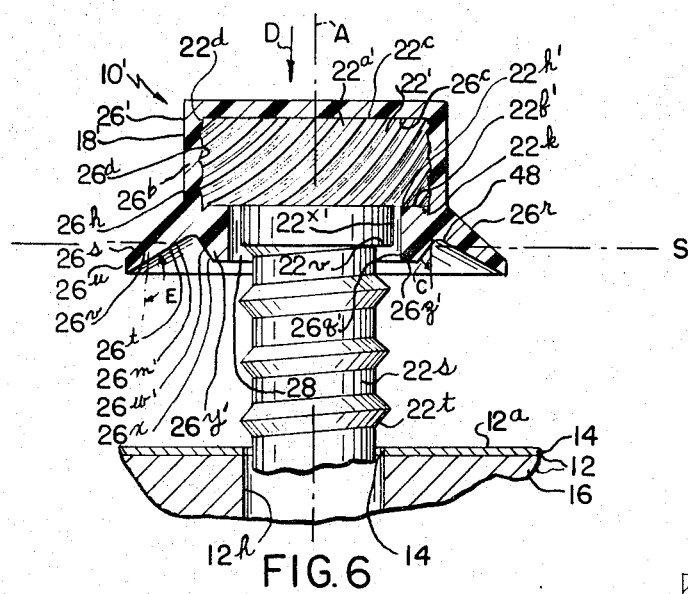
FIG. 6 is a side elevational view of a portion of a second form of fastener in the present invention with the plastic head thereof and fastener-receiving member shown in section and with the fastener being in relaxed and undriven position.
Figure 7:
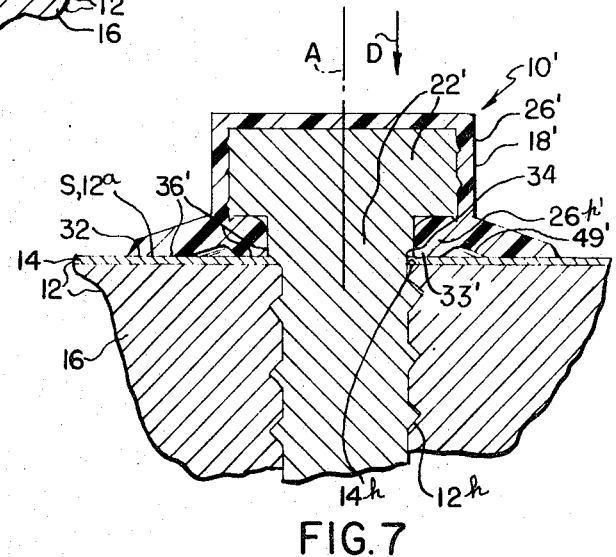
FIG. 7 is a vertical, longitudinal sectional view of a portion of the fastener in FIG. 6 shown in driven position in the fastener-receiving member.
Figure 3:
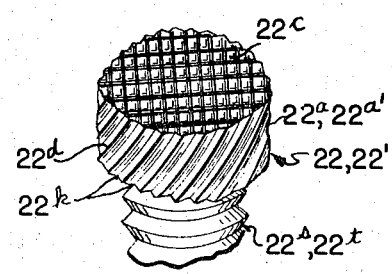
FIG. 3 is a perspective view of a portion of the screw-threaded metal insert used in the fasteners in FIGS. 1, 2, and 4—7 of the drawing.

There are disclosed herein two different forms of fasteners of the present invention: fastener 10 in FIGS. 4 and 5, and fastener 10' in FIGS. 6 and 7 of the drawing. The drawing FIGS. 1, 2 and 3 show views or component parts of each of these fasteners in FIGS. 4—7.

In this description, correspondingly named or functioning component parts have been given the same reference numeral, either primed or unprimed, for these two different fasteners 10 and 10'. Generally, the description will apply generically to each correspondingly named and numbered component part; and all component parts, structure, modes of operation, and advantages for both of these fasteners will be described at the same time. If structural differences exist, they will be specifically brought out hereafter.

Composite fastener 10 or 10' is a metal shank screw-type fastener having a molded plastic hexagon head with an integral sealing washer adapted to be driven from an undriven or relaxed position shown in FIG. 4 or 6 respectively into a driven position shown in FIGS. 5 or 7 in fastener-receiving member 12, or any other suitable workpiece, here shown as comprising sheet member 14 and base member 16.

For purposes of better understanding the present invention, certain imaginary reference surfaces, axes and directions have been established. Each fastener 10 or 10' is annular in form and symmetrical about its longitudinal central axis A, is adapted to be driven by a suitable wrench in driving direction D from an undriven position into a driven position, and has reference surface S placed thereon in the drawings for purposes of the present explanation. Fastener 10 or 10' has respectively fastener head 18 or 18' with each fastener head having in undriven position shown in FIG. 4 or 6 a given distance relationship relative to reference surface S (shown in the drawing as an edge of a reference plane extending perpendicular to the plane of the drawing) fixed relative to the fastener head, movable in driving direction D with the fastener head during driving, and defining (or coinciding with) outer or top surface 12a of fastener receiving member 12 when fastener 10 or 10' is in the driven position in FIG. 5 or 7.

Fastener 10 or 10' includes molded together metal insert 22 or 22' and plastic head 26 or 26'.

Inserts 22 and 22' are shown in detail in FIGS. 3—7. Insert 22 or 22' is generally a metal insert, formed by a cold heading operation for forming its enlarged shank head 22a or 22a', and may be formed from any suitable metal, such as carbon steel, alloy steel, brass, aluminum, aluminum alloy, etc. However, since the exposed head end of each fastener 10 or 10' is covered by plastic head 26 or 26', it is possible to obtain a corrosion resistant fastener by making insert 22 or 22' of ordinary carbon steel, instead of more expensive stainless steel. Insert 22 or 22' comprises fastener shank 22s rigidly carried by, here shown as integral with, shank head 22a or 22a' laterally larger than shank 22s. Shank 22s has helical threads 22t formed, generally rolled, on its periphery about longitudinal axis A of shank 22s having its thread helix advancing, or extending, in driving direction D from shank head 22a or 22a'. Insert 22 or 22' includes respectively shoulders 22v, 22w and 22h or shoulders 22v and 22h' connecting shank head 22a or 22a' with its fastener shank 22s with shoulders 22h or 22h' formed on shank head 22a or 22a', respectively. These shoulders not only have a plurality of functions mentioned in more detail hereinafter but also increase the strength of fastener 10 or 10' by reducing stress concentration found in a conventional fastening element at any sharp corner or small radius connecting its head and shank.

Shank head 22a or 22a' may be of any suitable design, but must be able to prevent axial pulloff of plastic head 26 or 26' when fastener 10 or 10' is in the driven position shown in FIG. 5 or 7. The top side of shank head 22a or 22a' has diamond knurl 22c on the side of the shank head most remote from reference surface S; has a generally cylindrical peripheral surface, coaxial with axis A and having thereon spiral helix 22d of the same hand as threads 22t (both helix 22d and threads 22t have their helix advancing in same driving direction D); has burr 22k or 22k' formed as an extension of, and extending around, the full cylindrical periphery on driving direction D side thereof; and has lead surface 22f or 22f' on the driving side of shank head 22a or 22a'. Lead surface 22f or 22f' comprises burrs 22k; shoulders 22v, 22w and 22h and connecting cylindrical surfaces 22x and 22y or shoulders 22v and 22h' and connecting cylindrical surface 22x'. Shoulder 22h or 22h', forming a shank head lead surface portion, forms angle B with axis A toward driving direction D measuring not substantially more than 90°.

Plastic head 26 or 26' is molded onto and surrounds shank head 22a or 22a'. This molding may be in any suitable manner, including casting, injection molding, etc. Injection molding is the preferred process so that the plastic material in head 26 or 26' will fill all of these slots, holes, grooves, and other passages or recesses in shank head 22a or 22a' with an integral mass of plastic material. Each fastener 10 or 10' has space 28 used during the injection molding operation to keep the injected plastic from flowing axially in direction D, over threads 22t by having a sealing portion of this injection mold die fitting into space 28 during the injection molding operation against shoulder 22w and cylindrical surface 22x in the fastener 10 or against shoulder 22h' and cylindrical surface 22x' in fastener 10'. A quantity of thermoplastic material is injected into the appropriate injection molding die cavity to form plastic head 26 or 26'; and after the material has set, the die is opened and headed fastener 10 or 10' removed by using conventional injection molding and die techniques.

Plastic head 26 or 26' may be formed of any suitable elastic thermoplastic material molded onto shank head 22a or 22a'. These materials include nylon, polyvinyl chloride, etc. This material preferably has the characteristics of forming an integral mass of high impact resistant; thermoplastic material on shank head 22a or 22a' having a high modulus of elasticity; good weathering properties; ability to flow readily during injection molding into, and to fill, completely all of the recesses and passages in shank head 22a or 22a'; good elastic memory; sufficient toughness and flexibility; etc. Thermoplasticity permits rapid molding of the fastener head. Elastic memory, high modulus of elasticity and sufficient flexibility provide good liquid sealing action by the fastener, not only initially but over a long and useful wear life. Good weathering properties provide a long and useful life for the plastic material and good weather and corrosion protection for metal insert 22 or 22'. Toughness prevents sharp edges on thin sheet member 14, such as formed by threads 22t from tearing the plastic material during fastener driving and gives the plastic material sufficient resistance to lateral spread and driveout to prevent the driving of the fastener in driving direction D from forcing radially outwardly annular plastic portion 26 p or 26p' in FIG. 5 or 7 out from under its locking shoulders 22h, 22w and 22v or locking shoulders 22h' and 22v on insert shank head 22a or 22a' so as to lock plastic head 26 or 26' on insert shank head 22a or 22a' against pulloff of plastic head 26 or 26' or of thin sheet member 14 from shank head 22a or 22a'. It has been found that a suitable material for this purpose is a nylon called 2382 grade of Zytel 101 (Zytel being a trademark of E. I. Du Pont de Nemours & Co. with grade 101 thereof being used), which is a 66 nylon (called hexamethylene adipate) being one form of nylon (which is a linear polyamide).

Plastic head 26 or 26' includes a plastic envelope around shank head 22a or 22a' comprising top 26a and sleeve 26b having respectively generally flat surface 26c and generally cylindrical bore 26d completely filling knurl 22c and spiral helix 22d on insert shank head 22a or 22a'. The outer periphery of sleeve 26b has wrench engagement surface 26h, used in driving fastener 10 or 10', and being in section transverse to axis A of any suitable equilateral geometrical configuration, here shown as a hexagon, to permit driving engagement by a standard wrench fastener head 18 or 18' of fastener 10 or 10' for driving in direction D.

Plastic head 26 or 26' integrally includes outer and inner annular skirts or sealing rings coaxial, and symmetrical, with axis A. Outer skirt or ring 26r on plastic head 26 or 26' has outer conical or beveled surface 26s, inner conical or beveled surface 26t, having an outwardly directed frustoconical portion end surface 26u connecting surfaces 26s and 26t, and portion 26v; and inner skirt or ring 26w or 26w' has outer conical or beveled surface 26x, inner cylindrical surface 26q or 26q', end surface 26z or 26z' connecting surfaces 26x and 26q or 26q', and portion 26y or 26y' respectively. Each of the portions 26v, 26y and 26y' is a portion of its respective skirt that extends in driving direction D through, and is located below, reference plane or surface S in the undriven position in FIG. 4 or 6. Outer skirts 26r are located at a larger radius from axis A than inner skirts 26w and 26w', and each skirt has an axial component of projection from fastener head 18 or 18' in driving direction D. Space 28 is bounded by surfaces 22x and 26q and shoulder 22w in fastener 10, and by surfaces 22x' and 26q' and shoulder 22h' in fastener 10'.

Each plastic head 26 or 26' has certain lead surface and angular relationships. Plastic head 26 or 26' has respectively lead surface 26m or 26m' on the driving direction side thereof (in driving direction D) respectively comprising surface 26q, 26t, 26u, 26x and 26z; or surface 26q', 26t, 26u, 26x, and 26z'. Each surface 26x forms acute angle C, and each surface 26t forms obtuse angle E, with axis A toward driving direction D.

Now, it should be apparent that the only major difference between fasteners 10 and 10' in the undriven position is in the structural shapes of shoulders 22w, 22h and 22h'; cylindrical surfaces 22x, 22x', 22y, 26q and 26q'; plastic head portions 26y and 26y'; and end surfaces 26z and 26z' to change the shape of fastener head 18 or 18', insert 22 or 22', insert shank head 22a or 22a', plastic head 26 or 26', lead surfaces 22f and 26m or 22f' and 26m', and annular skirt or sealing ring 26w or 26w'. Fastener 10' has only single annular shoulder 22v, while fastener 10 has two annular shoulders 22v and 22w, on metal insert 22' or 22 between its shank head 22a' or 22a and threaded shank 22.

The description heretofore has generally described fastener 10 or 10' with respect to its relaxed and undriven positions in FIG. 4 or 6, and especially with respect to reference surface S. The description hereafter will be concerned with the driven position shown in FIG. 5 or 7, and the actions occurring while each fastener moves from its undriven position in FIG. 4 or 6 to its driven position in FIG. 5 or 7, respectively.

Here is a brief description of the desired functions that each fastener 10 or 10' should have in its driven position in FIG. 5 or 7, respectively. First, plastic portion 26p or 26p' in fastener 10 or 10' respectively is securely held under shoulders 22h and 22w of insert 22a or under shoulder 22h' of insert head 22a' to be securely locked between such shoulder(s) and top surface 12a of fastening receiving member 12 so that plastic head 26 or 26' and sheet member 14 cannot be pulled off, or telescoped over, metal shank head 22a or 22a'. Second, three annular liquid or weathertight seals are provided, including outer seal 32, inner seal 33 or 33', and metal-to-metal seal 34. Flexible seals 32, 33 or 33' provide a watertight seal where there are minor irregularities on surface 12a of fastener receiving member 12. Annular seal 32, 33 or 33' is formed by deforming under high unit pressure in FIG. 5 or 7 respectively outer annular skirt or sealing ring 26r and inner skirt or sealing ring 26w or 26w' shown in FIG. 4 or 6. Third, component portions of fastener 10 or 10' provide driving stop 36 or 36' for preventing fastener overdriving so that there is no tendency either to ruin seal 32, 33 or 33' or to pull plastic head 26 or 26' or sheet member 14 off shank head 22a or 22a' by squeezing plastic portion 26p or 26p' out from underneath its respective locking shoulder. Driving stop 36 or 36' is formed respectively by the summation force, acting in the direction opposite to driving direction D, resisting driving of fastener 10 or 10' into its driven position. This resisting force is provided by the summation of the fastener driving resisting forces exerted by plastic deformation of plastic portion 26p or 26p' forming inner seal 33 or 33', by plastic deformation of outer seal 32, and by the resistance-fit relative to fastener-receiving member 12 in the driven position in FIG. 5 or 7 formed by shoulder 22v engaging surface 12a (because hole 12h in fastener-receiving member 12 is too small for cylindrical surface 22x or 22x' to enter) and/or by cylindrical surface 22x or 22x' entering hole 12h (smaller in diameter than surface 22x or 22x') with a resistance-fit.

Each of these three features mentioned in the preceding paragraph will be described in detail hereinafter by showing how they are formed while fastener 10 or 10' moves from the undriven position in FIG. 4 or 6 to the driven position in FIG. 5 or 7.

Fastener 10 or 10' is adapted to be driven into fastener receiving member 12 in any suitable manner. Prior to fastener driving, a small diameter hole 12h (less than the diameter of fastener threads 22t) having diameter K is preferably drilled into member 12, including members 14 and 16, to a greater depth than threaded shank 22s if fastener shank 22s is for a self-tapping fastener, which will be used as an example for illustration purposes here. However, it should be readily apparent that fastener 10 or 10' will work satisfactorily if shank 22s has conventional uniformly diametered threads 22t for receiving a nut, if shank 22s is on a nontapping tapered screw, etc. Now, fastener shank 22s is inserted into hole 12h and driven therein by a screw-type rotation action by having a suitable wrench engage and turn wrench surface 26h so as to drive fastener 10 or 10' about axis A into the driven position in FIG. 5 or 7, respectively. Then, fastener 10 or 10' and fastener-receiving member 12 will be firmly retained together in this driven position with sheet member 14 pulled down against base member 16.

Fastener 10 or 10' is especially adapted for handling thin sheet member 14 and for solving the three hereafter numbered problems associated with such thin sheet member separately given immediately hereafter.

First, the sharp edges (generally formed around hole 14h in sheet member 14 during threading of hole 14h by self-tapping fastener shank 22s) tend to shear, tear or cut any soft fastener sealing material. This is not true here because: (1) the thermoplastic material in plastic head 26 or 26', namely the nylon specified heretofore, is tough enough to resist any of this shearing, tearing, or cutting action; (2) three annular seals 32, 33 or 33', and 34 are provided so that if inner seal 33 or 33' is damaged in any way, two effective annular liquid seals still remain; and (3) although cylindrical surface 26q or 26q' and end surfaces 26z or 26z' closely surround shoulder 22v at the head end portion or threads 22t to provide the second and third problem solutions mentioned hereafter, these plastic portions are radially spaced in the undriven position in FIG. 4 or 6 therefrom by annular space 28, earlier formed by the plastic injection mold sealing surface earlier described. Since space 28 exists in the undriven position near the beginning of this fastener-driving operation while the threads are being formed in hole 14h and sharp edges of metal are actively being displaced therefrom, space 28 protects from damage surface 26q or 26q', which later form plastic portion 26p or 26p'. Hence, any sharp edges of hole 14h protruding into space 28 have minimum initial contact with the plastic, which is subsequently caused to flow, as the driven position is approached, into space 28 to lay over, or to bend over, the sharp edges as it forms locked plastic portion 26p or 26p' so as to render these sharp edges harmless.

The solutions to the second and third problems are obtained by having fastener threads 22t runout located above reference surface S in undriven position in FIG. 4 or 6, having annular skirt portions 26v and 26y or 26y' extend coaxial with axis A, and having an axial component of projection extend in the driving direction below and through reference surface S. This thread runout location exists since metal insert 22 or 22' has threads 22t formed thereon before plastic head 26 or 26' is molded thereon. Hence, the thread runout adjacent shoulder 22v will be contiguous to reference surface S above the lower edges of surfaces 26u, 26t and 26z or 26z' of plastic head 26 or 26'. hence, threads, 22t extend above the lower edge of these plastic sealing lips 26r and 26w or 26w' so that sheet member 14 can be pulled up tightly for proper sealing and close to fastener head 18 or 18' with these lips close to thread 22t so that these lips will engage sheet member 14 to prevent the thread formed in sheet member hole 14h from being stripped out. With this background, the second and third problem solutions will be described.

Second, plastic head 26 or 26' prevents drawing light gage sheet member or portion 14 of fastener receiving member 12 up to the shank head end of threads 22t at reference surface S during fastener driving. When a fastener is threaded into extremely light gage metal, there is a tendency for the metal to be drawn up toward the fastener head as the fastener is being driven; and if the sheet is pulled up into the thread runout area, the threads in the sheet member may be stripped out. Skirts 26r and 26w or 26w' will engage light gage sheet member 14 to prevent it from being pulled up into this dangerous thread runout area so as to prevent stripping of its threads.

Third, greater tightening torques are usable with thin sheet member 14 in the assembled and driven position for drawing members 14 and 16 tightly together. Since sheet member 14 engages full threads 22t, and threads are not stripped out in thin sheet member 14 a greater tightening torque can be applied than if the threads are partially stripped or sheet member 14 is in the thread runout area. This advantage is especially desirable when member 14 and 16, being secured together, are both light gage sheet members.

Now, as fastener 10 or 10' continues to drive, outer seal 32 and inner seal 33 or 33' begin to form. FIGS. 4 and 6 of the drawing show that outer sealing skirt 26r has its portion 26u extending down farther through reference surface S than portion 26y or 26y' of inner sealing skirt 26w or 26w' so that outer skirt 26r engages workpiece surface 12a before inner skirt 26w or 26w' to form sequentially outer and inner seals with workpiece surface 12a during fastener driving. Inner skirt 26w or 26w' is of smaller annulus radius than outer skirt 26r in the undriven position in FIG. 4 or 6.

It is necessary that, when a wrench is applied to wrench engagement surface 26h, the driving torque be transmitted through plastic head 26 or 26' to threads 22t; and it has been found that plastic head 26 or 26' made of the specified nylon will transmit this torque without damaging distortion. Suitable drive means is provided for driving shank head 22a or 22a' by plastic head 26 or 26' by coating drive portions on these heads. These drive portions are specifically shown herein as including diamond knurl 22c, spiral helix 22d and the complementary surface portions with which they engage on inner surfaces 26c and 26d of head 26 or 24'.

Any suitable type drive means can be formed on the periphery of shank head 22a or 22a', whether a knurl or a spiral helix, is generally formed by a rolling type, metal displacement action wherein a knurling-type tool may be radially pressed against the periphery of shank head 22a or 22a' rotating about axis A. This metal displacement action causes burrs 22k to be axially displaced from shoulder 22h or 22h' toward reference surface S from each valley thus formed by metal displacement so that these burrs extend in driving direction D from and on this peripheral surface to overhang the entire outer peripheral edge of shoulder 22h or 22h'.

Rotation of plastic head 26 or 26' by the wrench on surface 26h causes the plastic in head 26 or 26', and especially if it is loose on shank head 22a or 22a', to move axially in driving direction D toward reference surface S and fastener receiving member 12 by the driving action of spiral helixes 22d and 26d to improve the sealing action, as will be brought out in more detail hereinafter. Rotation of plastic head 26 or 26' by the wrench on surface 26h during fastener driving causes complementary and engaging spiral helix 22d on plastic head 26 or 26' and spiral helix 26d on the cylindrical peripheral surface of shank head 22a or 22a', coaxial with axis A, to force plastic head 26 or 26' in driving direction D toward reference surface S by turning of plastic head 26 or 26' by the wrench during fastener driving. This is true since the helixes of helixes 22d and 26d and of threads 22t are both of the same hand. Some portions of plastic head 26 or 26' thus axially moved in direction D, especially if head 26 or 26' is loose on shank head 22a or 22a', may be subsequently pushed radially under burrs 22k or shoulder 22h or 22h' to form some of locked plastic portion 26p', as will be described in more detail hereinafter.

Now, plastic portion 26p or 26p' is squeezed generally radially inwardly around insert 22 or 22' between top surface 12a of fastener receiving member 12 and at least a portion of shank head lead surface 22f or 22f', comprising burrs 22k and shoulders 22h and 22w or shoulder 22h'. This action appears to be caused by angle C and conical, beveled or inwardly tapered lip surface 26x as plastic zones on inner sealing ring 26w or 26w' causing skirt 26w or 26w', when it contacts or engages fastener receiving member surface 12a during fastener driving as it approaches the driven position since portion 26y or 26y' thereof extends below reference surface S, to be deflected radially inwardly to be forced inwardly into annular space 28 (located inwardly of plastic head 26 or 26', generally around the junction of threaded shank 22s and shank head 22a or 22a' of metal insert 22 or 22', and earlier formed by the plastic injection mold sealing surface earlier described during the molding of plastic head 26 or 26' on insert 22 or 22') to close at least some of space 28 to form at least some of locked plastic portion 26p or 26p' in the driven position in FIG. 5 or 7. Plastic lip 26w or 26w' on the lead side of plastic head 26 or 26' (toward driving direction D), having tapered periphery 26x converging in driving direction D and having portion 26y or 26y' extending in its undriven position in driving direction D beyond reference surface S, includes plastic zones engaging fastener member receiving surface 12a and plastic portions axially squeezed in direction D and radially inwardly squeezed toward axis A during fastener driving for forming locked plastic portion 26p or 26p' of inner flexible plastic seal 33 or 33' and portion of driving stop 36 or 36' as will be explained in more detail in the subsequent paragraphs.

When fastener 10 or 10' the fully driven position in FIG. 5 or 7, reference surface or plane S coincides with top surface 12a of fastener receiving member 12 since it has moved downwardly in driving direction D with fastener 10 or 10'. This fastener driving is stopped by driving stop 36 or 36' having a stopping force made up of the summation of the following three numbered stopping forces.

First, outward and upward flexure of outer annular skirt or sealing ring 26r, as it is deflected upwardly and outwardly by engagement of inner conical or beveled surface 26t (forming angle E) with fastener member receiving surface 12a, resists further driving of fastener 10 or 10' in driving direction D. In the driven position, outer skirt 26r forms outer annular seal 32.

Second, some of the portions of plastic head 26 or 26' that were axially squeezed inwardly toward insert 22 or 22' on the driving sides of plastic head 26 or 26', fastener head 18 or 18', and shank head 22a or 22a' are now generally axially squeezed between fastener receiving member surface 12a and at least a portion of shank head lead surface 22f or 22f' (comprising a shoulder 22h and 22w or shoulder 22h'). At least some of the radially inwardly squeezed plastic portions during fastener driving form locked plastic portion 26p or 26p' not only for locking plastic head 26 or 26' and sheet member 14 under shank head 22a or 22a' in the driven position but also for creating resistance to further fastener driving in direction D to form part of driving stop 36'. Shoulder 22h or 22h', forming at least a portion of shank head lead surface 22f or 22f', forms angle B with axis A of not substantially more than 90° so as to lock plastic portion 26p or 26p' under this shoulder surface 22h or 22h'. If the angle were substantially greater than 90° (such as an obtuse angle), it has been found that driving the fastener will tend to force, or well force the plastic head axially up off its shank head. Hence, angle B of this measurement helps to lock portion 26p or 26p' under the shank head in the driven position.

Third, the fastener driving action in direction D continues, in spite of the flexible first and second portions of driving stop 36 or 36' just described, as provided by plastic portion 26p or 26p' and outer seal 32, until positive stop is made by forming metal-to-metal seal 34 to form the final resistance to further fastener driving. This positive stop is provided by an annular portion of shank head lead surface 22f or 22f' (comprising shoulder 22v and/or cylindrical surface 22x or 22x' coaxial with axis A) located closer to axis A than plastic head lead surface 26m or 26a', extending in the driving direction from shank head 22a or 22a', having its lower portion extending through reference surface S with its shoulder 22v in driving direction D from reference surface S, and having a resistance-fit relative to fastener receiving member 12 in the driven position so that fastener 10 or 10' will be stopped in this driven position in FIG. 5 or 7 by the summation of the driving resistances formed by this resistance-fit and plastic flexing in portion 26p or 26p' and seal 32.

In one suitable form of fastener 10 given near the end of this specification, hole 12h in fastener receiving member 12 may be drilled to diameter K of 0.228 inch, or even as small as 0.187 inch, while outside diameter G of ¼ inch screw threads 22t is approximately 0.238/0.246 inch and diameter V of cylindrical surface 22x is 0.238/0.242 inch. Then, shoulder 22v will engage against top surface 12a with a resistance-fit, since hole 12h is of smaller diameter than surface 22x to stop fastener driving at a given fastener-driving torque. If a larger driving torque is used or hole 12h is made larger in diameter, the resistance-fit may be formed by having cylindrical surface 22x travel down into hole 12h with a forced fit (resistance-fit) to provide the positive stop. Generally, this sized fastener 10 is tightened with about 30 to 50 inch-pounds of torque. Either of these two aforedescribed resistance-fits will provide the desired positive stopping action.

It should be apparent that this aforedescribed sequential radial inward and axial squeezing will cause some plastic portions moved in driving direction D by interengaged spiral helixes 22d and 26d to move in direction D axially past and then under burrs 22k, which will act as barbs after the fastener reaches the driven position to lock these portions then and to prevent return radial outward flow of any plastic portion radially inwardly and axially squeezed under shoulders 22h and 22w, or shoulder 22h'.

Smooth cylindrical surface 22x or 22x' provides additional advantages to inner seal 33 or 33'. This smooth cylindrical surface not only minimizes tearing of plastic portion 26p or 26p', when compared with plastic contact with rough fastener threads, but also gives a better and tighter sealing action because of its smooth cylindrical surface larger in diameter than threads 22t.

These components of fastener driving stop 36 or 36' control the amount that the plastic is flexed at time of fastener driving so that the fastener driver and user always gets the same amount of compression in each fastener on each of the seals 32, 33 or 33' and 34; gets uniform results from the driven fasteners; obtains solid and positive stopping by stop 36 or 36'; locks plastic head 26 or 26' and thin sheet member 14 on and under shank head 22a or 22a'; and is prevented from overtightening or overdriving fastener 10 or 10'.

There are provided three annular fluid seals 32, 33 or 33' and 34 with the first two seals being flexed plastic portions of head 26 or 26' and the last seal being a metal-to-metal seal. Inner seal 33 or 33' has the plastic portion thereof crowded or squeezed axially into good sealing engagement and for preventing outward flow of this sealing plastic portion even if one attempts to overdrive the fastener. These three concentric annular seals 32, 33 or 33', and 34 are formed since lead surface portions 22f or 22f' and 26m or 26m' and many plastic portions of plastic head 26 or 26' are generally annular in form coaxial about axis A in their undriven position in FIG. 4 or 6 to provide annular seals against liquid entry into the fastener hole 12h in fastener-receiving member 12 when squeezed together in the driven position in FIG. 5 or 7. Plastic head 26 or 26' is firmly locked on shank head 22a or 22a' after the metal-to-metal stop surfaces engage to form seal 34 since a void or space 28 had been left under shoulder 22h' or 22w into which portions of plastic head 26 or 26' off shank head 22a or 22a' by the fastener-driving action. Even if one attempts to overtorque the fastener in driving, angle B will prevent pulling the plastic head 26 or 26' off fastener shank head 22a or 22a', which pulloff may not be prevented if angle B were an obtuse angle substantially greater than 90°. Forming metal-to-metal seal 34 provides a consistent and positive end stop giving the same, consistent, good sealing, and other good results desired. The axial distance of shoulder 22v from shank head shoulder 22h or 22h' is carefully selected so as to stop automatically fastener 10 or 10' in a preselected driven position to give the best sealing action. This prevents overtightening or overtorquing fastener 10 or 10' during its driving into the driven position to the detriment of plastic head 26 or 26' so as to prevent axial pulloff of sheet member 14 or plastic head 26 or 26' from insert shank head 22a or 22a' possibly destroying the sealing properties of seals 32, 33 and/or 34.

Also, metal-to-metal seal 34, wherein fastener 10 or 10' has its metal shoulder 22v driven into metal contact with metal sheet member 14, assures holding of the fastener in event of destruction of plastic head 26 or 26' because the metal-to-metal contact provides by itself an independent and positive annular seal and fastening means. If a fire should occur in a construction having fasteners 10 or 10', the melting or destruction of plastic heads 26 or 26' thereof would not result in a failure of the fastener securement together of fastener-receiving members 14 and 16.

It should be apparent that some alternative structures, not illustrated, are within the scope of the present invention. First, although inner and outer sealing rings 26w or 26w' and 26r are shown in the drawing, it should be readily apparent that a less desirable seal, but within the scope of the present invention, could be obtained by eliminating outer sealing ring 26r and its outer seal 32 since locked plastic portion 26p or 26p' would still form flexible annular inner seal 33 or 33'. However, since portion 26v extends farther below reference surface S than portion 26y or 26y' of these respective outer and inner sealing rings, it should be apparent that a higher state of plastic and fluid compression is achieved to obtain a better seal by using outer sealing ring 26r. This higher state of compression is readily apparent when one looks at and compares the large voids or spaces 28 and 48 above reference surface S in FIG. 4 or 6 with the small remaining space 49 or 49' in FIG. 5 or 7. Second, although seal 33 or 33' has been described as being formed by the coaction of angle E, fastener receiving member surface 12a, conical or beveled sealing skirt surface 26x, and space 28 under shank head lead surface 22f or 22f', it should be readily understood that even if a cylindrical surface were provided in place of beveled surface 26x under insert lead surface 22f or 22f' some plastic would flow radially inwardly to space 28 and be axially squeezed to form a modified, and perhaps less effective, inner seal 33 or 33' still within the scope of the present invention.

It has been found that the dimensions of one operable form of fastener 10 in FIGS. 1—5 having a standard 7/16-inch across flats hex head 26h, having a ¼-inch screw thread 22t, having insert 22 formed of steel, and having plastic head 26 formed by the injection molded nylon specified is as follows:

G = 0.240/0.246 inch (¼ inch thread)
H = 0.120 inch
J = 0.055 inch
K = 0.187–0.228 inch
L = 0.015 inch
M = 0.437 inch (7/16 inch across hex flats)
N = 0.375/0.380 inch
P = 0.150/0.155 inch
Q = 0.180 inch
R = 0.045/0.050 inch
T = 0.285/0.290 inch
U = 0.625 inch
V = 0.238/0.242 inch
W = 0.295/0.300 inch
X = 0.300 inch
Y = 0.025 inch
Z = 0.040/0.045 inch
0.020 inch radius joining surfaces 26t and 26x.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

I claim:

1. A composite screw type fastener adapted to be driven from an undriven position in a driving direction into a driven position into a fastener-receiving member wherein the head of the fastener has in the undriven position a given distance relationship relative to a reference surface fixed relative to the fastener head and defining the surface of the fastener-receiving member in said driven position, comprising:
   a metal insert having a fastener shank rigid with a shank head laterally larger than said shank;
   said fastener shank having helical threads on its periphery about the longitudinal axis of said shank extending in a driving direction from said shank head,
   said shank head having a lead surface on the driving direction side thereof;
   an elastic thermoplastic head molded onto and surrounding said shank head and having a lead surface on the driving direction side thereof;
   plastic generally axial squeeze means on the driving direction sides of said heads for generally axially squeezing between said fastener-receiving member and at least a portion of said shank head lead surface some plastic portions of said plastic head during fastener driving for locking said plastic head on said insert head in said driven position;
   said lead surface portions and plastic portions being generally annular in said undriven position to provide a seal against liquid entry into the fastener hole in said fastener-receiving member when squeezed together in said driven position;
   at least a portion of said shank head lead surface portion forming an angle with said axis toward the driving direction of not substantially more than 90° so as to lock said plastic portions under said shank head lead surface portion in said driven position;
   said plastic head lead surface having two annular skirts thereon, coaxial with said axis, of different radii, with an axial component of projection in the driving direction and with a portion extending through the reference surface in said undriven position;
   one of said skirts extending farther through said reference surface than the other skirt so that said one skirt engages said workpiece surface before the other to form seals sequentially with said workpiece surface during fastener driving;
   said other skirt being of smaller annulus radius than said one skirt in said undriven position and including an inwardly tapered lip; and
   said one skirt including an outwardly directed frustoconical portion.

2. A composite screw-type fastener adapted to be driven from an undriven position in a driving direction into a driven position into a fastener-receiving member wherein the head of the fastener has in the undriven position a given distance relationship relative to a reference surface fixed relative to the fastener head and defining the surface of the fastener-receiving member in said driven position, comprising:
   a metal insert having a fastener shank rigid with a shank head laterally larger than said shank;
   said fastener shank having helical threads on its periphery about the longitudinal axis of said shank extending in a driving direction from said shank head;
   said shank head having a lead surface on the driving direction side thereof;

an elastic thermoplastic head molded onto and surrounding said shank head and having a lead surface on the driving direction side thereof;

plastic generally radial inward squeeze means on said plastic head coactable with the fastener-receiving member surface for generally radially inwardly squeezing during fastener driving plastic portions between said fastener-receiving member and at least a portion of said shank head lead surface by plastic zones on the plastic head engaging the fastener-receiving member surface during fastener driving;

plastic generally axial squeeze means on the driving direction sides of said heads for generally axially squeezing between said fastener-receiving member and at least a portion of said shank head lead surface at least some of the radially inwardly squeezed plastic portions during fastener driving to lock said plastic head on said insert head in said driven position; and said radial inward and axial squeeze means including:
- a lip having an external peripheral surface axially extending and inwardly tapered in the driving direction on a lead surface of said plastic head and having a free edge for engaging the fastener receiving member;
- the external tapered surface of said lip being constructed and arranged relative to the internal contour of the lip so that the inward force on the lip produced by the effective taper of the external lip surface with respect to the axis of the fastener is greater than the outward force produced by the outward force producing contour of the internal peripheral surface of said lip for exerting an inward thrust on said lip as the fastener moves toward driven position; and
- and annular space located in the inward path of movement of a portion of the lips, extending to the axial squeeze means on said shank head, and generally around the junction of the threaded shank and shank head of said metal insert.

3. A fastener, as set forth in claim 2, with at least a portion of said shank head lead surface portion forming an angle with said axis toward the driving direction of not substantially more than 90° so as to lock said plastic portions under said shank head lead surface portion in said driven position.

4. A composite screw-type fastener adapted to be driven from an undriven position in a driving direction into a driven position into a fastener-receiving member wherein the head of the fastener has in the undriven position a given distance relationship relative to a reference surface fixed relative to the fastener head and defining the surface of the fastener-receiving member in said driven position, comprising:
- a metal insert having a fastener shank rigid with a shank head laterally larger than said shank, said fastener shank having helical threads on its periphery about the longitudinal axis of said shank extending in a driving direction from said shank head, said shank head having a lead surface on the driving direction side thereof;
- an elastic thermoplastic head molded onto and surrounding said shank head and having a lead surface on the driving direction side thereof, said shank head having drive means for forcing said plastic head relative to the shank head toward said reference surface in response to turning of said plastic head during fastener driving; and
- plastic generally radially inward squeeze means on said plastic head coactable with the surface of the fastener-receiving member for generally radially inwardly squeezing during fastener driving plastic portions between said fastener-receiving member and at least a portion of said shank head lead surface, said radial inward and axial squeeze means including a lip having an external peripheral surface axially extending and inwardly tapered in the driving direction on a lead surface of said plastic head and having a free edge for engaging the fastener-receiving member.

5. A fastener, as set forth in claim 4, with plastic generally axial squeeze means on the driving direction sides of said heads for generally axially squeezing between said fastener-receiving member and at least a portion of said shank head lead surface at least some of the radially inwardly squeezed plastic portions during fastener driving to lock said plastic head on said shank head in said driven position.

6. A fastener, as set forth in claim 4, with said drive means on said shank head having projecting metal burrs extending on the periphery thereof in the driving direction therefrom and thereon for locking said inwardly squeezed plastic portions in said driven position by said burrs acting as barbs.

7. A fastener, as set forth in claim 4, with said drive means including a spiral helix knurl on the periphery of said shank head.

8. A composite screw-type fastener adapted to be driven from an undriven position in a driving direction into a driven position into a fastener-receiving member wherein the head of the fastener has in the undriven position a given distance relationship relative to a reference surface fixed relative to the fastener head and defining the surface of the fastener-receiving member in said driven position, comprising:
- a metal insert having a fastener shank rigid with a shank head laterally larger than said shank;
- said fastener shank having helical threads on its periphery about the longitudinal axis of said shank extending in a driving direction from said shank head;
- said shank head having a lead surface on the driving direction side thereof;
- an elastic thermoplastic head molded onto and surrounding said shank head and having a lead surface on the driving direction side thereof;
- plastic generally axial squeeze means on the driving direction sides of said heads for generally axially squeezing between said fastener-receiving member and at least a portion of said shank head lead surface some plastic portions of said plastic head during fastener driving for locking said plastic head on said insert head in said driven position;
- said lead surface portions and plastic portions being generally annular in said undriven position to provide a seal against liquid entry into the fastener hole in said fastener-receiving member when squeezed together in said driven position;
- said plastic head lead surface having two annular skirts thereon, coaxial with said axis, of different radius, with an axial component of projection in the driving direction and with a portion extending through the reference surface in said undriven position;
- one of said skirts extending farther through said reference surface than the other skirt so that said one skirt engages said workpiece surface before the other to form seals sequentially with said workpiece surface during fastener driving;
- said one skirt including an outwardly directed frustoconical portions;
- said other skirt being of smaller annulus radius than said one skirt in said undriven position and including an external peripheral lip surface inwardly tapered in the driving direction; and
- the external tapered surface of said lip being constructed and arranged relative to the internal contour of the lip so that the inward force on the lip produced by the effective taper of the external lip surface with respect to the axis of the fastener is greater than the outward force produced by the outward force producing contour of the internal peripheral surface of said lip for exerting an inward thrust on said lip as the fastener moves toward driven position.

9. A fastener, as set forth in claim 8, with at least a portion of said shank head lead surface portion forming an angle with said axis toward the driving direction of not substantially more than 90° so as to lock said plastic portions under said shank head lead surface portion in said driven position.

UNITED STATES PATENT OFFICE
CERTIFICATE OF CORRECTION

Patent No. 3,557,654          Dated January 26, 1971

Inventor(s) Harry C. Weidner, Jr.

It is certified that error appears in the above-identified patent and that said Letters Patent are hereby corrected as shown below:

In [73] on the cover page, "Bolt and Screw" should read --Bolt & Screw--. Column 1, line 26, "members, and" should read --members; and--. Column 2, line 71; column 3, line 58 column 9, lines 10 and 20, "pulloff" should be --pull off--. Column 3, line 50, "22t" should read --22t,--; line 52, "driveout" should be --drive-out--; line 63, "66" should read --6 6--. Column 4, line 5, "26t," should read --26t--; line "tion end" should read --tion, end--; line 52, "insert 22a" should read --insert head 22a--; line 54, "fastening" should read --fastener--. Column 5, line 24, "nontapping" should read --non-tapping--. Column 6, line 2, ". hence, threads, should read --. Hence, threads 22t--; line 26, "14 a" should read --14,a--; line 30, "member 14" should read --members 1 line 34, "26u" should read --26v--; line 48, "coating" should read --coacting--; line 52, "or 24'." should read --or 26'. Column 7, line 39, "36'" should read --36',--; line 41, "10 should read --10' reaches the--; line 74 "well force" should read --will force,--. √Column 8, line 12, "26a'," should read --26m',--; line 25, "0.238/0.246" should read --0.240/0.246 Column 9, line 6, "26' off" should read --26' flows to act a lock against lifting plastic head 26 or 26' off--; line 8, "overtorque" should be --over-torque--; lines 17-18, "overtightening" should be --over-tightening"; line 18, "overtorquing" should be --over-torquing--; line 45, "obtai should read --give--; line 56, "22f' some" should read --22 some--. Column 10, lines 23, 28, 31, 38, 43, 48, 53, 58, 7 75 and 77; column 11, lines 3, 23 and 32; and column 12, li 23, 26, 28, 31, 38, 43, 48 and 53, ";" should read --,--. Column 10, line 61 and column 12, line 59, "; and" should read --,--. Column 12, line 55, "portions;" should read --portion,--. Column 11, line 11, ";" should read --,and-- line 18, "; and" should read --;--; line 33, "and annular" should read --an annular--; lines 50-61 should read --

UNITED STATES PATENT OFFICE
CERTIFICATE OF CORRECTION

Patent No. 3,557,654   Dated January 26, 1971

Inventor(s)  Harry C. Weidner, Jr.

It is certified that error appears in the above-identified patent and that said Letters Patent are hereby corrected as shown below:

a metal insert having a fastener shank rigid with a sha
      head laterally larger than said shank,
    said fastener shank having helical threads on its perip
      about the longitudinal axis of said shank extending i
      a driving direction from said shank head,
    said shank head having a lead surface on the driving
      direction side thereof,
    an elastic thermoplastic head molded onto and surroundi
      said shank head and having a lead surface on the driv
      direction side thereof,
    said shank head having drive means for forcing said pla
      head relative to the shank head toward said reference
      surface in response to turning of said plastic head
      during fastener driving, and--.

and lines 67-72 should read -- shank head lead surface,
    said radial inward and axial squeeze means including a
      having an external peripheral surface axially extendi
      and inwardly tapered in the driving direction on a le
      surface of said plastic head and having a free edge f
      engaging the fastener-receiving member.--.

Signed and sealed this 5th day of October 1971.

(SEAL)
Attest:

EDWARD M. FLETCHER, JR.           ROBERT GOTTSCHALK
Attesting Officer                  Acting Commissioner of Paten